US011982885B2

(12) United States Patent
Gu

(10) Patent No.: US 11,982,885 B2
(45) Date of Patent: May 14, 2024

(54) ELECTRICALLY TUNABLE METASURFACE

(71) Applicant: HUAWEI TECHNOLOGIES CO., LTD., Guangdong (CN)

(72) Inventor: Huanhuan Gu, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/380,192

(22) Filed: Jul. 20, 2021

(65) Prior Publication Data
US 2023/0033227 A1    Feb. 2, 2023

(51) Int. Cl.
G02F 1/01    (2006.01)
(52) U.S. Cl.
CPC ................. G02F 1/0123 (2013.01)
(58) Field of Classification Search
CPC ... G02F 1/0126; G02F 1/0136; G02F 2202/30
See application file for complete search history.

(56) References Cited

U.S. PATENT DOCUMENTS

| | | | | |
|---|---|---|---|---|
| 11,385,104 | B2* | 7/2022 | Yao | G02B 1/002 |
| 2015/0309218 | A1 | 10/2015 | Shalaev et al. | |
| 2018/0076521 | A1 | 3/2018 | Mehdipour et al. | |
| 2018/0292644 | A1 | 10/2018 | Kamali et al. | |
| 2019/0079321 | A1* | 3/2019 | Wu | G02F 1/0555 |
| 2019/0383982 | A1 | 12/2019 | Lee et al. | |
| 2020/0357997 | A1* | 11/2020 | Moddel | H02N 11/008 |
| 2021/0336345 | A1* | 10/2021 | Falk | H01Q 21/065 |

FOREIGN PATENT DOCUMENTS

CN    111987472 A    11/2020

OTHER PUBLICATIONS

Yu, N. et al., Light Propagation with Phase Discontinuities: Generalized Laws of Reflection and Refraction, Science, vol. 334, 2011.
Chen, D. et al., The novel graphene metasurfaces based on split-ring resonators for tunable polarization switching and beam steering at terahertz frequencies, Carbon 154, 350-356, 2019.
Hisiao. H-H. et al., Fundamentals and applications of metasurfaces, Small Methods, 2017.
Yang, C. et al., Terahertz planar lenses based on plasmonic metasurfaces, Physics Letters A 383, 789-792, 2019.
International Search Report and Written Opinion issued in co-pending International application No. PCT/CN2022/106251 dated Oct. 10, 2022.

* cited by examiner

Primary Examiner — Christopher Stanford
Assistant Examiner — Journey F Sumlar
(74) Attorney, Agent, or Firm — BCF LLP

(57) ABSTRACT

There are disclosed an electrically tunable metasurface and a method for modulating propagation characteristics of an incident plane wave. The electrically tunable metasurface comprising: i) a plurality of scatterer rings, each one of the plurality of scatterer rings including bow-tie radiator elements, the bow-tie radiator elements in a corresponding scatterer ring having a same geometric configuration; and ii) a plurality of electrodes, each electrode being configured to provide a biasing voltage to the corresponding scatterer ring. The method comprising: i) receiving, by an electrically tunable metasurface, the incident plane wave; and ii) modulating the propagation characteristics of the incident plane wave by providing specific biasing voltage to the corresponding scatterer rings.

20 Claims, 20 Drawing Sheets

ELECTRICALLY TUNABLE METASURFACE

CROSS-REFERENCE TO RELATED APPLICATIONS

This is the first application filed for the instantly disclosed technology.

TECHNICAL FIELD

The present disclosure generally relates to waveguides and, in particular, to an electrically tunable metasurface.

BACKGROUND

Typically, metamaterials are referred to as artificially synthesized materials that are generally characterized by a repeating pattern of structural elements that have characteristic lengths on the order of less than the wavelength of the waves that they are meant to be incident. For example, photonic metamaterials (also known as optical metamaterials), which are meant to control the propagation of visible light, include structural elements that have characteristic lengths on the order of nanometers, the wavelength of visible light being on the order of hundreds of nanometers.

Metasurfaces can be referred to as two-dimensional metamaterials to the extent as they are characterized by a repeating pattern of subwavelength antenna elements, and they can offer many of the same advantages as metamaterials. Indeed, metasurfaces can even be advantageous relative to metamaterials in many respects. For example, metasurfaces can be made to more efficiently transmit light as compared to metamaterials.

Nowadays, metasurfaces have been used to alter the propagation characteristics of the optical plane waves. However, various existing techniques suffer a problem of operational bandwidth. To this end, there is an interest in designing an efficient metasurface for modulating propagation characteristics of an incident plane wave.

SUMMARY

The embodiments of the present disclosure have been developed based on developers' appreciation of shortcomings associated with the prior arts namely a lower operational bandwidth of the metasurfaces.

Developers of the present technology have devised in apparatus and methods directed towards an electrically tunable metasurface. The electrically tunable metasurface may benefit from the broadband nature of bow-tie radiator elements and can increase the operational bandwidth as compared to other conventional techniques. The electrically tunable metasurface may include an array of bow-tie radiator elements having various geometric configurations, the bow-tie radiator elements being electrically tunable to control the phase and/or magnitude of transmitted plane waves including (but not limited to) electromagnetic waves having wavelengths on the order of those of visible light and/or near-infrared (near-IR) light.

In accordance with a first broad aspect of the present disclosure, there is provided an electrically tunable metasurface comprising: a plurality of scatterer rings, each one of the plurality of scatterer rings including bow-tie radiator elements, the bow-tie radiator elements in a corresponding scatterer ring having a same geometric configuration; and a plurality of electrodes, each electrode being configured to provide a biasing voltage to the corresponding scatterer ring In accordance with other embodiments of the present disclosure, the electrically tunable metasurface, wherein the bow-tie radiator elements associated with each scatterer ring have a specific geometric configuration.

In accordance with other embodiments of the present disclosure, the electrically tunable metasurface, wherein the geometric configuration associated with the bow-tie radiator elements of the corresponding scatterer ring corresponds to an angle between two elements of each bow-tie element of the corresponding scatterer ring.

In accordance with other embodiments of the present disclosure, the electrically tunable metasurface, wherein the two elements are selected from a triangular and a trapezoidal radiator element.

In accordance with other embodiments of the present disclosure, the electrically tunable metasurface, wherein the geometric configuration associated with the bow-tie radiator elements of the corresponding scatterer ring corresponds to an angular orientation of the bow-tie radiator elements of the corresponding scatterer ring.

In accordance with other embodiments of the present disclosure, the electrically tunable metasurface, wherein each of the plurality of the electrodes provides a specific biasing voltage to the corresponding scatterer ring.

In accordance with other embodiments of the present disclosure, the electrically tunable metasurface wherein the metasurface is constructed using graphene material.

In accordance with other embodiments of the present disclosure, the electrically tunable metasurface, wherein the plurality of scatterer rings are configured to modulate propagation characteristics of an incident plane wave.

In accordance with other embodiments of the present disclosure, the electrically tunable metasurface, wherein the propagation characteristics are a phase and a magnitude of the incident plane wave.

In accordance with other embodiments of the present disclosure, the electrically tunable metasurface, wherein the phase of the incident wave is modulated in a range of 0 to $2\pi$.

In accordance with other embodiments of the present disclosure, the electrically tunable metasurface, wherein the propagation characteristics of the incident plane wave are modulated by varying the biasing voltage provided to the corresponding scatterer rings.

In accordance with other embodiments of the present disclosure, the electrically tunable metasurface, wherein the plurality of scatterer rings are concentric.

In accordance with other embodiments of the present disclosure, the electrically tunable metasurface, wherein a phase response of an outer scatterer ring of the plurality of scatterer rings is smaller as compared to a phase response of an inner scatterer ring of the plurality of scatterer rings.

In accordance with other embodiments of the present disclosure, the electrically tunable metasurface, wherein the bow-tie radiator elements are subwavelength radiator elements.

In accordance with other embodiments of the present disclosure, the electrically tunable metasurface, wherein the electrically tunable metasurface is operating as a metalens, and a focal length of the metalens is controlled by varying the biasing voltage.

In accordance with a second broad aspect of the present disclosure, there is provided an apparatus to characterize material, the apparatus comprising: an electrically tunable metasurface comprising: a plurality of scatterer rings, each one of the plurality of scatterer rings including bow-tie radiator elements, the bow-tie radiator elements in a corresponding scatterer ring having a same geometric configuration, and a plurality of electrodes, each electrode being configured to provide biasing voltage to the corresponding scatterer ring; a transmitting antenna configured to incident plane waves over the electrically tunable metasurface; the electrically tunable metasurface configured to modulate the propagation characteristics of the incident plane waves and forward the incident plane waves towards a dielectric material; a receiving antenna configured to receive the incident plane waves passed through the dielectric material; and a processor configured to process the received incident plane wave to determine characterization properties of the dielectric material.

In accordance with a second broad aspect of the present disclosure, there is provided a method for modulating propagation characteristics of an incident plane wave, the method comprising: receiving, by an electrically tunable metasurface, the incident plane wave, the electrically tunable metasurface comprising: a plurality of scatterer rings, each one of the plurality of scatterer rings including bow-tie radiator elements, the bow-tie radiator elements in a corresponding scatterer ring having a same geometric configuration; a plurality of electrodes, each electrode being configured to provide biasing voltage to the corresponding scatterer ring; and modulating the propagation characteristics of the incident plane wave by providing specific biasing voltage to the corresponding scatterer rings.

BRIEF DESCRIPTION OF THE FIGURES

Further features and advantages of the present disclosure will become apparent from the following detailed description, taken in combination with the appended drawings, in which.

Figure 1A:
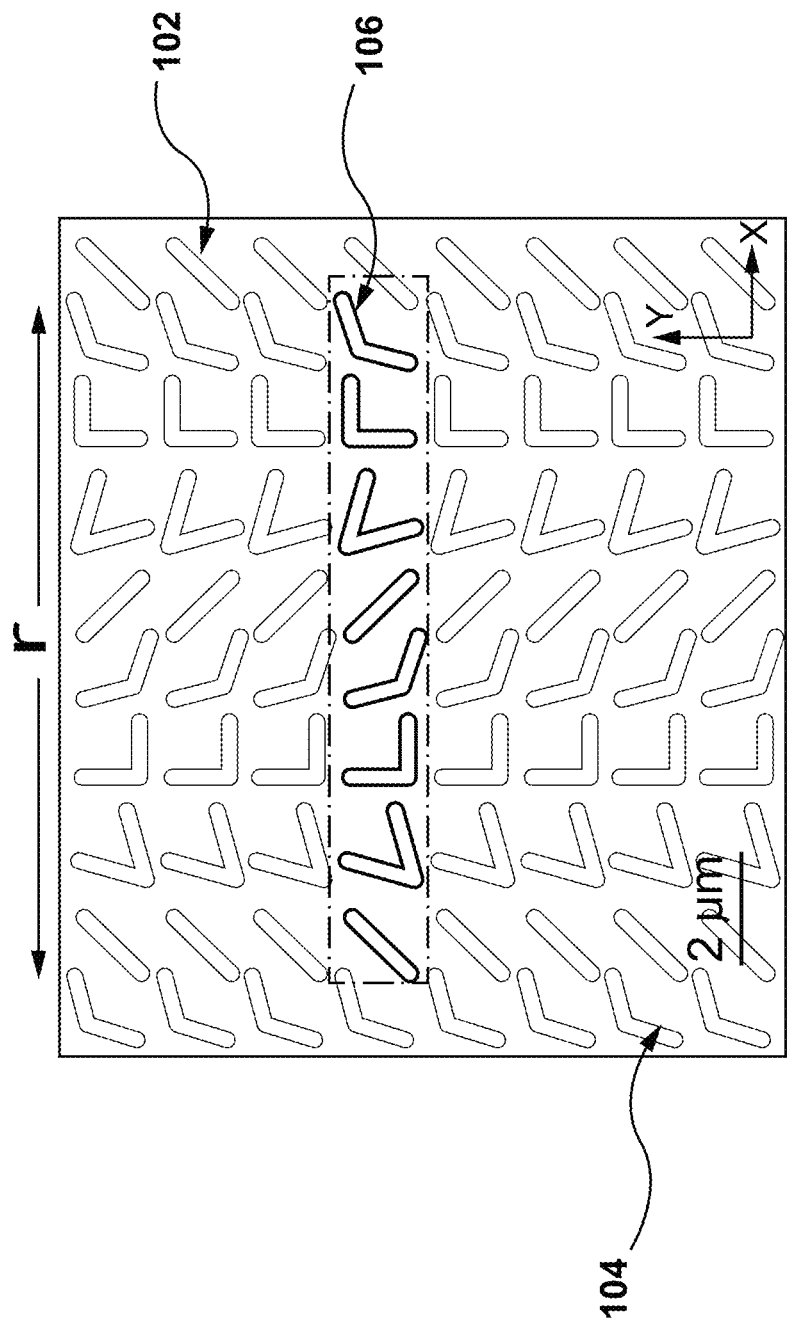
FIG. 1A (Prior Art) illustrates a metasurface including phased array radiator elements that demonstrates an ability to shift the phase of incident electromagnetic waves.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes an apparatus and method for wireless communication.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes an apparatus and method for wireless communication.

Various drawings, systems and methods of the present disclosure are directed towards implementing electrically tunable metasurfaces. In certain non-limiting embodiments, an electrically tunable metasurface may include an array of bow-tie radiator elements having various geometric configurations, the bow-tie radiator elements being electrically tunable to control the phase and/or magnitude of transmitted plane waves including (but not limited to) electromagnetic waves having wavelengths on the order of those of visible light and/or near-infrared (near-IR) light.

Generally, metamaterials and metasurfaces have been recognized to possess extensive potential to control the plane waves. However, much of the developments in this area have been confined to metasurfaces that are largely fixed in the plane wave responses that they generate, and that are configured to operate over a limited bandwidth. As a result, there has been an interest in developing tunable metamaterials/metasurfaces that may have the plane wave responses that they generate dynamically controlled post-fabrication with a wideband response.

In many instances it may be desirable to exert control of the plane wave response of a metasurface over a wideband. For example, it may be desirable to be able to locally control the plane wave response over a wideband characteristic within a metasurface. Accordingly, in various non-limiting embodiments of the present disclosure, tunable metasurfaces configured to respond to the plane waves having frequencies in the range of 0.5-3 THz are implemented, where localized voltages may be used to modulate the localized plane wave response characteristics of the metasurfaces. Additionally, various embodiments of the present disclosure may implement metasurfaces having improved bandwidth response. As can be appreciated, such robust metasurfaces may be practically implemented in any of a variety of applications. For example, in many embodiments, the metasurfaces of the present disclosure may assist in orienting plane waves, thereby improving a performance of high-speed antennas.

Also, in various non-limiting embodiments, the metasurfaces of the present disclosure may assist in sensing and/or imaging applications. In various non-limiting embodiments, the metasurfaces of the present disclosure may be utilized to realize holography. In several non-limiting embodiments, the metasurfaces of the present disclosure may be utilized to realize animated holography. Indeed, the metasurfaces of the present disclosure may be implemented in any of a variety of applications that may benefit from such a robust wave front shaping ability. Before a detailed description of the structure of the metasurfaces of the present disclosure, certain conventional techniques are presented below.

FIG. 1A (Prior Art) illustrates a metasurface including phased array radiator elements that have an ability to shift the phase of incident plane waves. In particular, FIG. 1A depicts a metasurface 102 including a plurality of v-shaped phased array radiator elements 104. The highlighted v-shaped phased array radiator elements 106 represent the various radiator elements that are used to have $2\pi$ phase coverage. In other words, each of the depicted subwavelength radiator elements basically has the effect of shifting the phase of the incident plane wave by a certain amount, with the extent of the shift being based on the geometry of the radiator element. Accordingly, the depicted 8 subwavelength radiator elements 106 have different geometries, and thereby shift the incoming waves by different amounts. In the illustrated example, the varying geometries have an ability to shift the phase of the incident waves by any amount from 0 to $2\pi$, with the shift being based on the geometry of the radiator element.

Figure 1B:
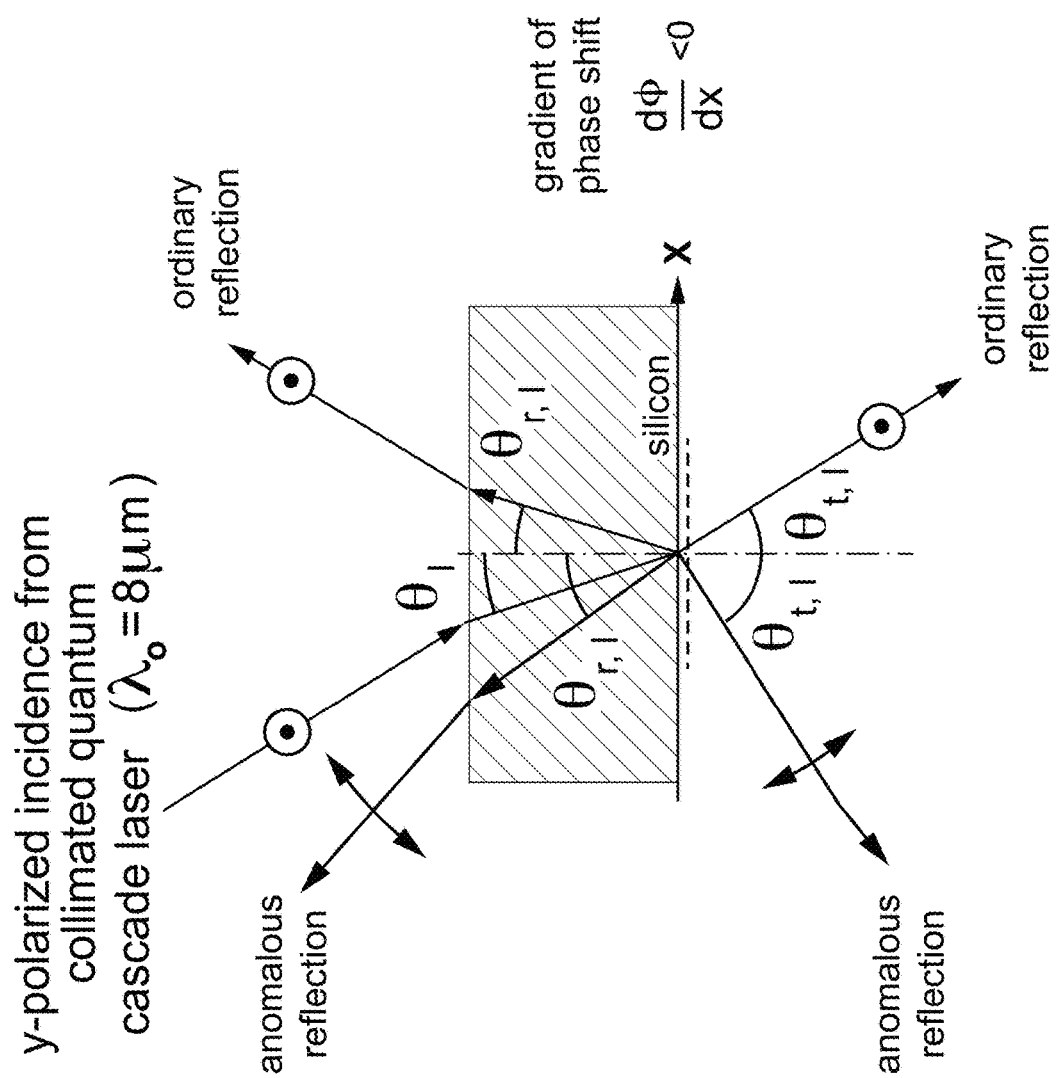
FIG. 1B (Prior Art) illustrates a schematic of an experimental setup for y-polarized light incident over a silicon substrate with radiators.

FIG. 1B (Prior Art) illustrates a schematic of an experimental setup for y-polarized light incident over a silicon substrate with radiators. The y-polarized incident light is provided from a collimated quantum cascade laser ($\lambda_0=8$ µm) and is directed through the silicon substrate with radiators, producing both anomalous and ordinary reflection as well as both anomalous and ordinary refraction. Various conventional techniques rely on wired type radiator elements to form the V-shaped phased array radiator elements 104 (as shown in FIG. 1A).

Figure 1C:
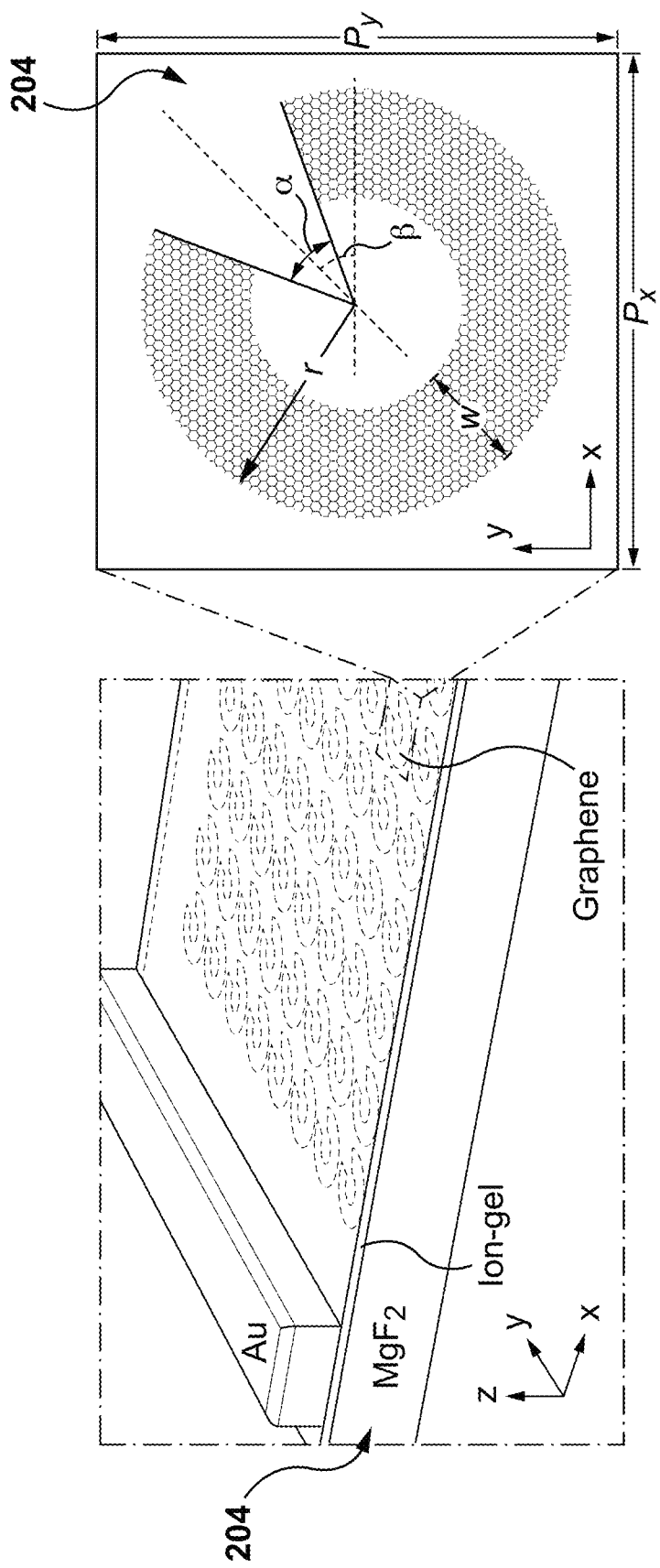
FIG. 1C (Prior Art) illustrates a schematic of graphene split-ring metasurface and an associated unit cell.

Further, certain conventional techniques rely on graphene to design the tunable metasurfaces. FIG. 1C (Prior Art) a schematic of a graphene split-ring metasurface 202 and an associated unit cell 204. The graphene split-ring surface 202 includes a plurality unit cells 204 periodically patterned for linearly polarizing the incident plane waves. The metasurface is tunable from 0.7 to 1.9 terahertz (THz), by biasing the entire metasurface with different voltages.

Figure 1D:
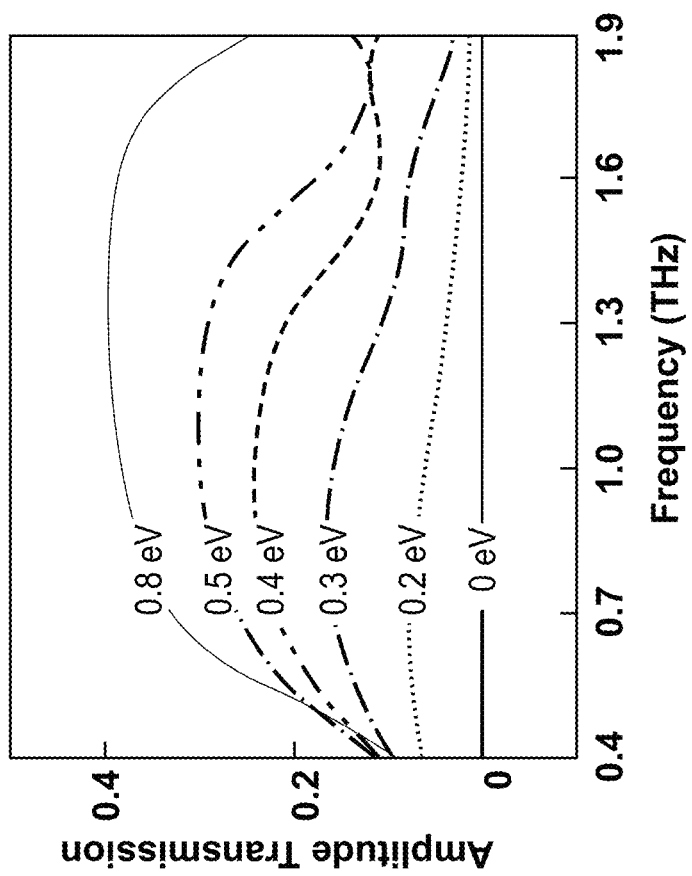
FIG. 1D (Prior Art) illustrates simulated spectra of cross-polarized components of the transmitted light using the graphene split-ring surface with different Fermi energy.

FIG. 1D (Prior Art) illustrates simulated spectra of cross-polarized components of the transmitted light using the graphene split-ring surface 202 with different Fermi energy. As shown, for different Fermi energy levels, amplitude transmission responses corresponding to the graphene split-ring metasurface 202 have a frequency range of 0.7 to 1.9 THz.

It is to be noted that even though the graphene split-ring metasurface 202 is electrically tunable, the amplitude transmission response is limited to a frequency range of 0.7 to 1.9 THz. Thus, there is an interest in designing a metasurface that offers a wideband response over the THz frequency range.

Figure 2:
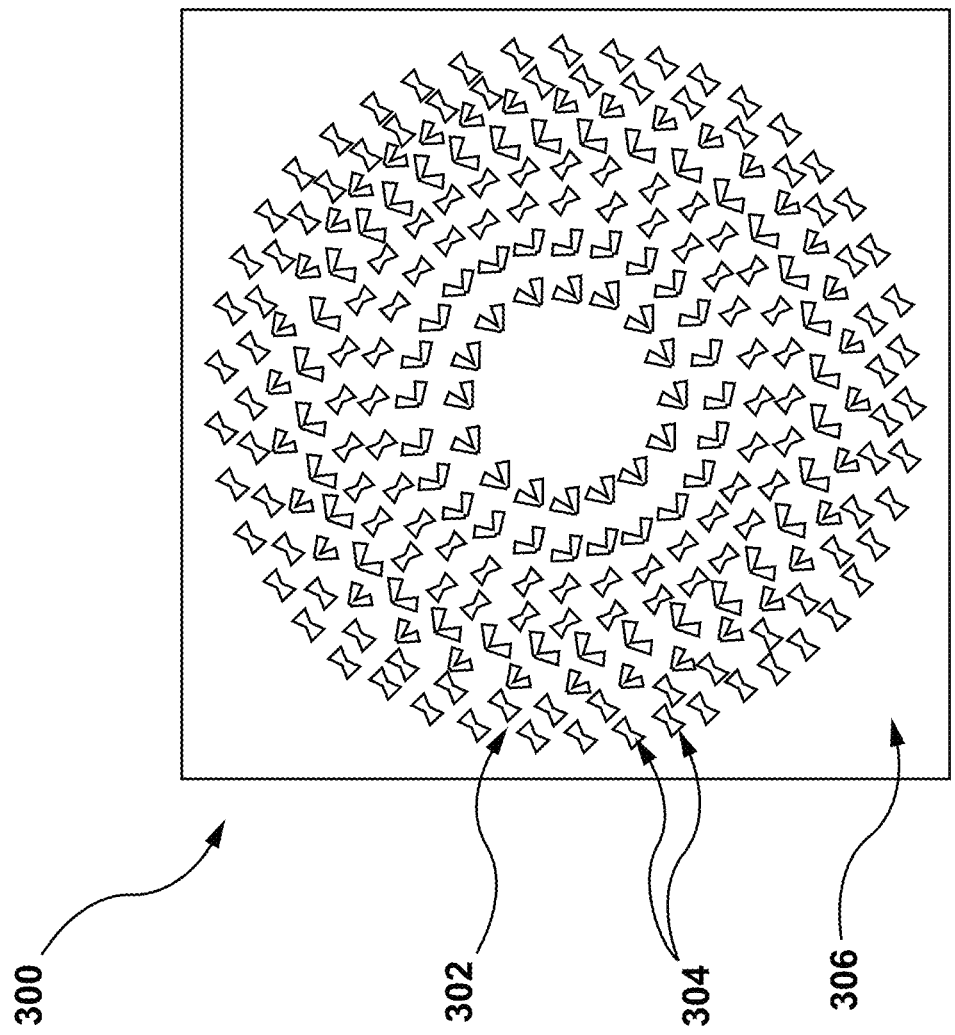
FIG. 2 illustrates an electrically tunable metasurface designed to modulate the propagation characteristics of the incident plane waves, in accordance with various non-limiting embodiments of the present disclosure.
Figure 4:
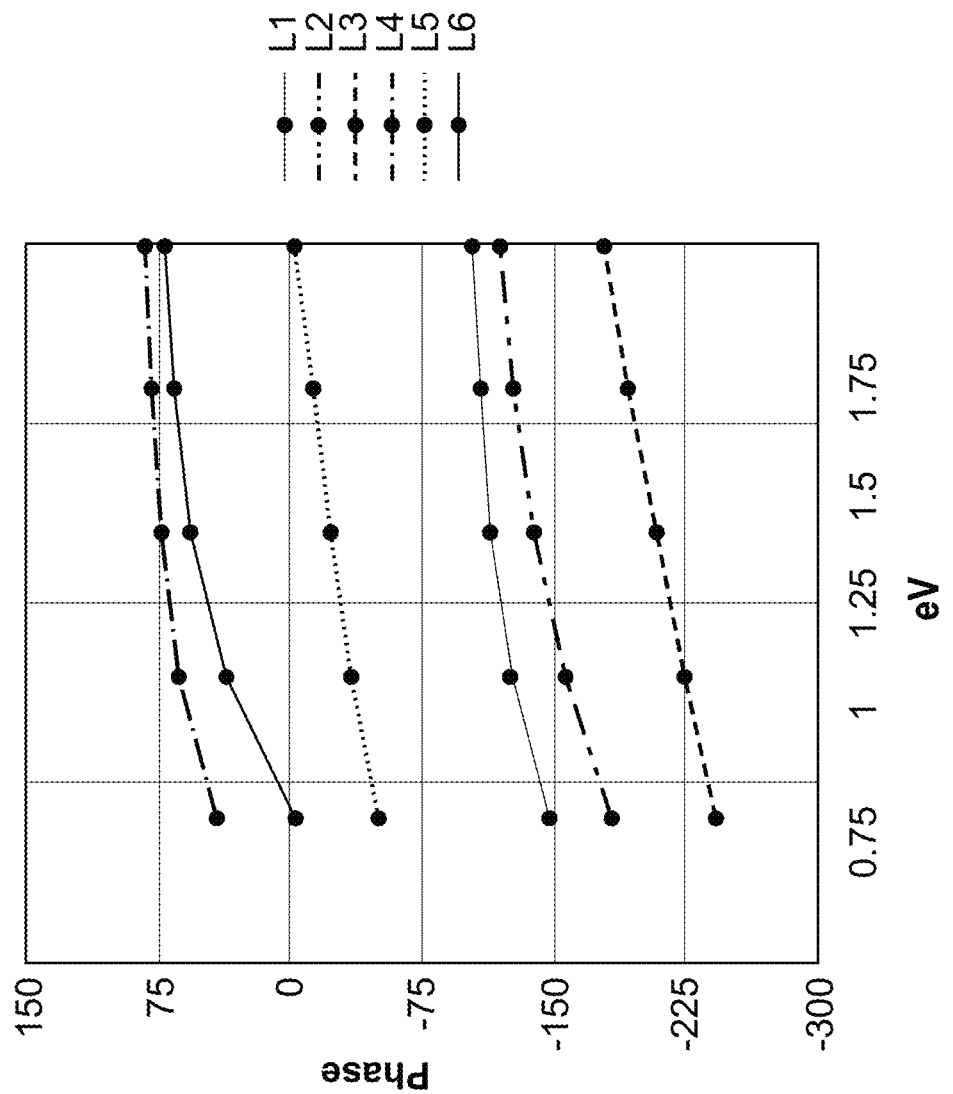
FIG. 4 illustrates a graphical representation of the phase response of various geometric configuration of the bow-tie radiator elements provided with different biasing voltages, in accordance with various non-limiting embodiments of the present disclosure.

FIG. 2 illustrates an electrically tunable metasurface 300 designed to modulate the propagation characteristics of the incident plane waves, in accordance with various non-limiting embodiments of the present disclosure. In certain non-limiting embodiments, electrically tunable metasurface 300 may modulate the propagation of plane waves having frequency in the range of 0.5-3 THz. In various non-limiting embodiments, biasing voltage may be locally applied to modulate propagation characteristics of the incident plane waves. Different scatterer rings 302 may introduce different phase shift (as shown in FIG. 4) to the incident plane waves. In so doing, the scatterer rings 302 may accumulate a phase variation of around $2\pi$ from the center to the edge of electrically tunable metasurface 300.

It is to be noted that the modulation may strongly correlate with the geometric configuration of bow-tie radiator elements 304 associated with the electrically tunable metasurface 300.

In certain non-limiting embodiments, the bow-tie radiator elements 304 may be subwavelength bow-tie radiator elements.

It is to be appreciated that the plane wave response of the electrically tunable metasurface 300 is also a function of the constituent materials of the metasurface. In general, the structure and composition of metasurfaces may be tailored to implement desired plane wave response characteristics by selectively implementing particular structures/compositions that may give rise to the desired plane wave response characteristics. In certain non-limiting embodiments, the electrically tunable metasurface 300 may be constructed using graphene material.

As illustrated, the electrically tunable metasurface 300 may include a plurality of scatterer rings 302. Each one of the plurality of scatterer rings 302 may include bow-tie radiator elements 304. The electrically tunable metasurface 300 may benefit from the wideband response of the bow-tie radiator elements 304.

Each of the bow-tie radiator element 304 may include two elements placed at an angle θ, the value of θ being specific to bow-tie radiator elements 304 of a particular scatterer ring 302. In certain non-limiting embodiments, for a given angle θ, bow-tie radiator element related to two different scatterer rings 302 may have different angular orientations. In some of the non-limiting embodiments, the two elements may be triangular radiator elements. In other non-limiting embodiments, the two elements may be trapezoidal radiator elements. Further, each of the bow-tie radiator elements 304 may be biased at the center with a voltage.

To design the electrically tunable metasurface 300, various geometric configurations of the bow-tie radiator elements 304 may be considered to determine a phase response and a magnitude response corresponding to the incident plane wave. The geometric configuration may correspond to the angle θ between the two elements of the bow-tie radiator elements 304. For different angles θ, the bow-tie radiator elements 304 may have a different phase and the magnitude response. In certain non-limiting embodiments, the bow-tie radiator elements 304 may be subwavelength radiator elements.

In certain non-limiting embodiments, the electrically tunable metasurface 300 may be constructed using graphene material. Further, the scatterer rings 302 may be coated with conductive ion-gel and then may be connected to electrodes which provides different bias voltages.

In certain non-limiting embodiments, the propagation characteristics may be referred to as a phase and/or magnitude of the incident plane wave.

Figure 3:
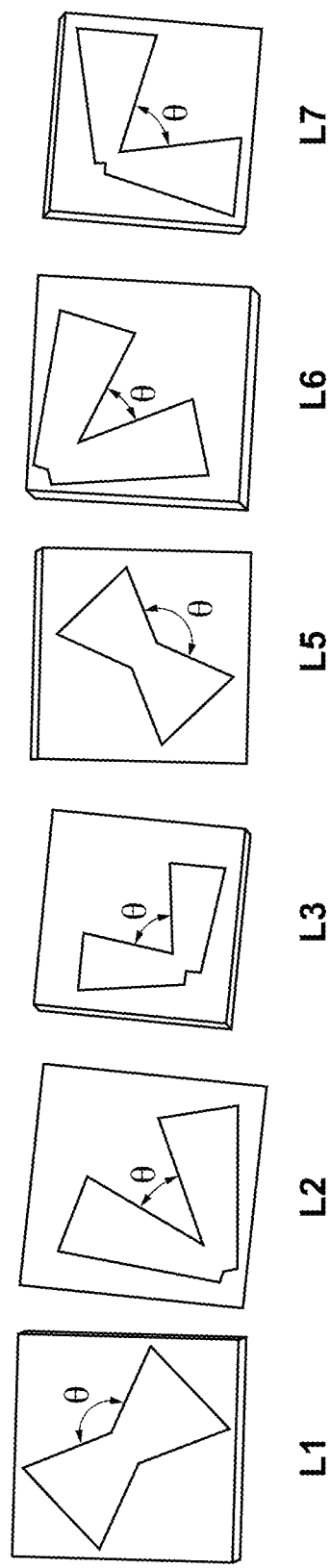
FIG. 3 represents different geometric configuration of the bow-tie radiator elements, in accordance with various non-limiting embodiments of the present disclosure.

FIG. 3 represents different geometric configuration of the bow-tie radiator elements 304, in accordance with various non-limiting embodiments of the present disclosure. As shown, the L1, L2, L3, L5, L6, and L7 configurations correspond to a set of angles that may span a $2\pi$ range for example, −225, −184, −142, −100, −50, −3, 41, 83. In certain non-limiting embodiments, each of the L1, L2, L3, L5, L6, and L7 configurations may be applied with different voltages to determine the phase and magnitude response. Table 1 illustrates the phase and magnitude responses corresponding to an incident plane wave having frequency 1 THz.

TABLE 1

| | Voltage | | | | | | |
|---|---|---|---|---|---|---|---|
| | 0.75 eV | 1 eV | 1.25 eV | 1.5 eV | 1.75 eV | 0.8 eV | 1.8 eV |
| | Frequency | | | | | | |
| | 1 THz | 1 THz | 1 THz | 1 THz | 1 THz | 1 THz | 1 THz |
| L1 phase (in degree) | −147 | −126 | −115 | −108 | −104 | −142 | −100 |
| L1 magnitude | 0.27 | 0.24 | 0.21 | 0.2 | 0.18 | 0.27 | 0.17 |
| L2 phase (in degree) | −184 | −157 | −139 | −127 | −120 | | |
| L2 magnitude | 0.26 | 0.31 | 0.32 | 0.31 | 0.3 | | |
| L3 phase (in degree) | −243 | −225 | −209 | −193 | −179 | | |
| L3 magnitude | 0.2 | 0.23 | 0.26 | 0.29 | 0.3 | | |
| L5 phase (in degree) | 41 | 63 | 73 | 79 | 83 | | |
| L5 magnitude | 0.25 | 0.21 | 0.18 | 0.16 | 0.15 | | |
| L6 phase (in degree) | −50 | −35 | −23 | −13 | −3 | | |
| L6 magnitude | 0.2 | 0.23 | 0.27 | 0.3 | 0.33 | | |
| L7 phase (in degree) | −3 | 36 | 56 | 66 | 71 | | |
| L7 magnitude | 0.3 | 0.25 | 0.2 | 0.16 | 0.14 | | |

In order to design the electrically tunable metasurface 300, the geometric configuration of the bow-tie radiator elements 304 may be selected in a predetermined manner. In one non-limiting embodiment, the geometric configuration having a lower phase response (e.g., negative phase response) may be used to design an outer scatterer ring of the electrically tunable metasurface 300. Similarly, the geometric configuration having a higher phase response (e.g., positive phase response) may be used to design an inner scatterer ring of the electrically tunable metasurface 300. In other words, a phase response of an outer scatterer ring of the plurality of scatterer rings 302 is smaller as compared to a phase response of an inner scatterer ring of the plurality of scatterer rings.

FIG. 4 illustrates a graphical representation of the phase response of various geometric configuration of the bow-tie radiator elements 304 provided with different biasing voltages, in accordance with various non-limiting embodiments of the present disclosure.

Table 2 illustrates the geometric configurations and the associated voltages selected to from Table 1 to design the electrically tunable metasurface 300, in accordance with one non-limiting embodiment.

As discussed above, each of the scatterer rings may have the specific configuration. The term "specific configuration" may be referred to as an orientation of the two elements associated with the bow-tie radiator element 304. In certain non-limiting embodiments, a corresponding scatterer ring may have all the bow-tie elements with the same geometric configuration. In other words, all of the bow-tie radiator elements 304 associated with the corresponding scatterer ring may have a same angle θ between the two elements of the bow-tie radiator elements 304.

In some of the non-limiting embodiments, two scatterer rings of the plurality of scatterer rings 302 may have a same geometric configuration. While in other non-limiting embodiments, each one of the plurality of scatterer rings 302 may have a different geometric configuration. Therefore, the bow-tie radiator elements 304 associated with each scatterer ring 302 have a specific geometric configuration. It may be noted that the same specific geometric configuration may possibly be repeated in more than one scatterer rings 302.

In certain non-limiting embodiments, the plurality of scatterer rings 302 may be concentric. In some embodiments, the plurality of scatterer rings 302 may be circular. In other embodiments, the plurality of scatterer rings 302 may be elliptical or oval.

TABLE 2

| | L3-1 eV | L2-0.75 eV | L1-0.8 eV | L1-1.8 eV | L6-0.75 eV | L7-0.75 eV | L5-0.75 eV | L5-1.75 eV |
|---|---|---|---|---|---|---|---|---|
| magnitude | 0.23 | 0.26 | 0.27 | 0.17 | 0.2 | 0.3 | 0.25 | 0.15 |
| Phase (in degrees) | −225 | −184 | −142 | −100 | −50 | −3 | 41 | 83 |

Each of the scatterer ring may have a specific geometric configuration based on the magnitude and the phase response. By way of an example, the L3 configuration corresponding to 1 THz and 1 eV having a phase response of −225 may represent the outermost scatterer ring of the geometric configuration of the bow-tie radiator elements 304. Similarly, the L5 corresponding to 1 THz and 1 eV having a phase response of 83 may represent the innermost scatterer ring of the geometric configuration of the bow-tie radiator elements 304. It is to be noted that the above values of the magnitude, phase, frequency and the voltages are merely representative and in various non-limiting embodiments other values of the magnitude, phase, frequency and the voltages may be considered for designing the electrically tunable metasurface 300.

Figure 5:
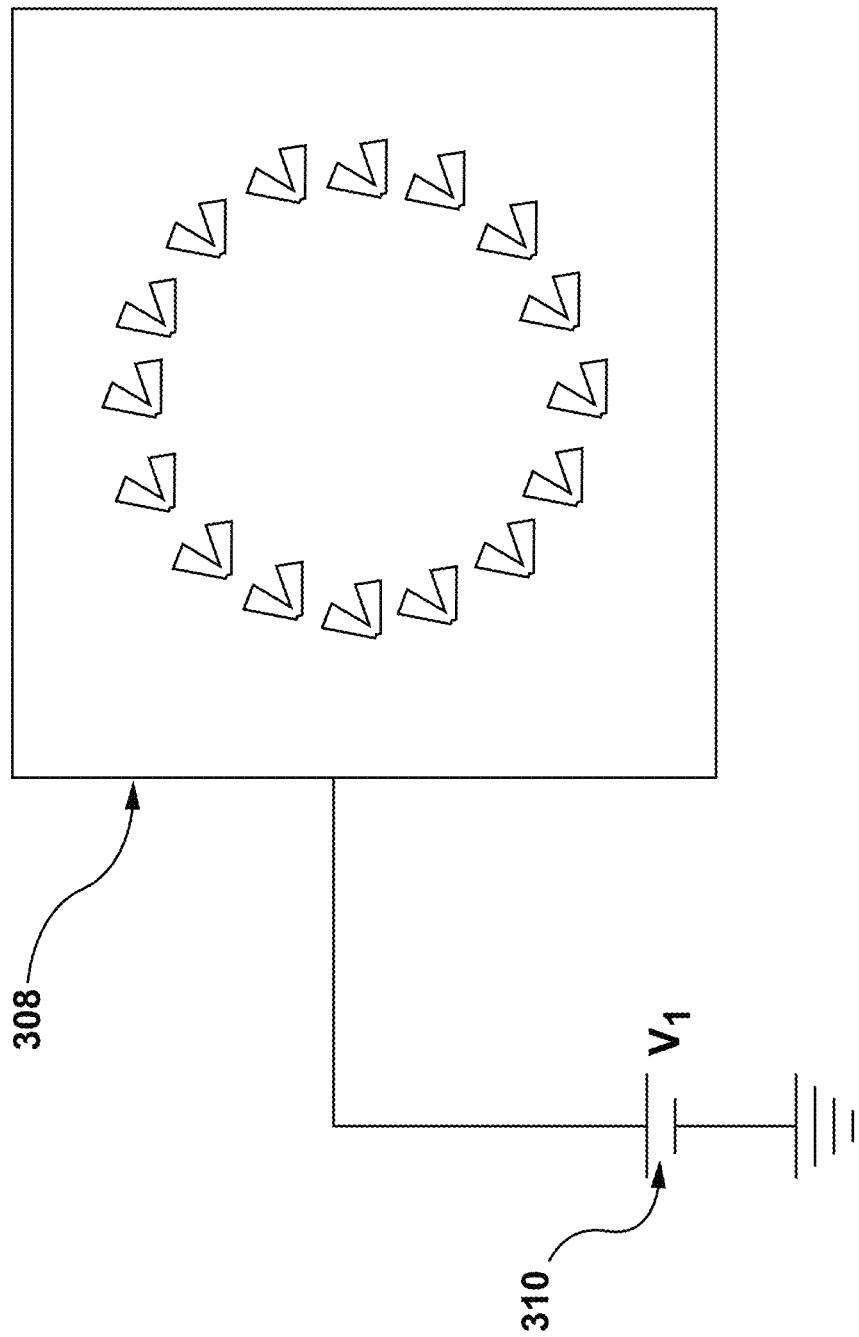
FIG. 5 illustrates a corresponding scatterer ring including the bow-tie elements having a L2 geometric configuration, in accordance with various non-limiting embodiments of the present disclosure.

In various non-limiting embodiments, the electrically tunable metasurface 300 may include a plurality of electrodes, each electrode being configured to provide the biasing voltage a corresponding scatterer ring. By way of an example, FIG. 5 illustrates a corresponding scatterer ring 308 including the bow-tie radiator elements 304 having the L2 as the geometric configuration, in accordance with various non-limiting embodiments of the present disclosure. As shown, the corresponding scatterer ring 308 may be connected to an electrode 310 configured to provide the biasing voltage $V_1$.

Figure 6:
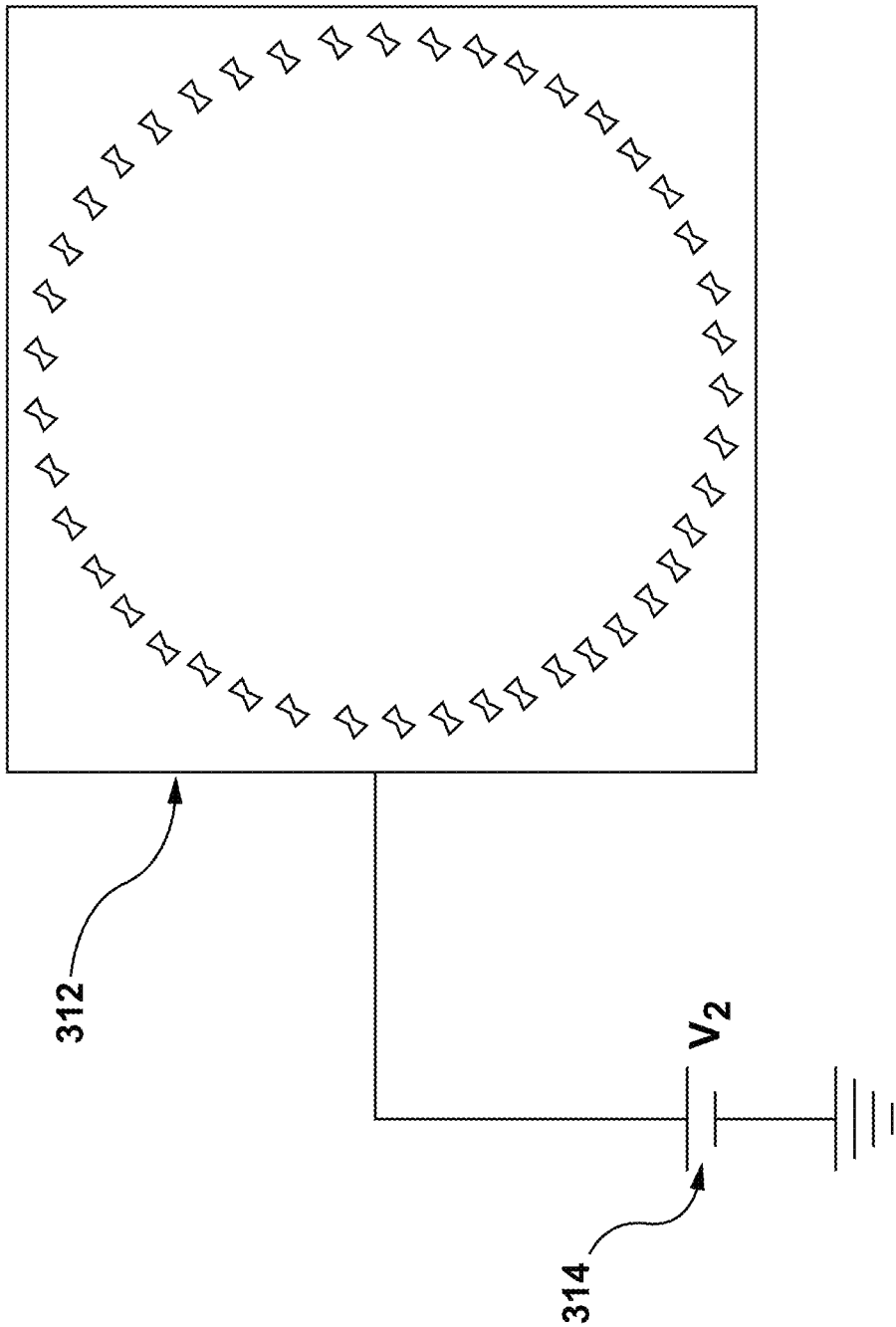
FIG. 6 illustrates a corresponding scatterer ring including the bow-tie elements having a L5 geometric configuration, in accordance with various non-limiting embodiments of the present disclosure.

FIG. 6 illustrates a corresponding scatterer ring 312 including the bow-tie radiator elements 304 having the L5 as the geometric configuration, in accordance with various non-limiting embodiments of the present disclosure. As shown, the corresponding scatterer ring 312 may be connected to an electrode 314 configured to provide the biasing voltage $V_2$.

In certain non-limiting embodiments, the electrode (e.g., the electrodes 310 and 314) may provide specific biasing voltages to the associated scatterer rings 302. The term "specific voltage" may be referred to as a voltage applied based on the geometric configuration of the bow-tie radiator elements 304 in the corresponding scatterer ring 308 that corresponds to a desired phase and magnitude response. If the two scatterer rings 308 and 312 are having different geometric configurations, the electrodes 310 and 314 may provide the same or different biasing voltages. Likewise, if the two scatterer rings 308 and 312 are a same different geometric configuration, the electrodes 310 and 314 may provide same or different biasing voltages.

In certain non-limiting embodiments, the electrically tunable metasurface 300 may modulate the propagation characteristics of the incident plane wave by varying the biasing voltages applied to each one of the plurality of scatterer rings. In certain non-limiting embodiments, the electrically tunable metasurface 300 may modulate the phase of the incident plane wave in a range of 0 to $2\pi$.

Figure 7A:
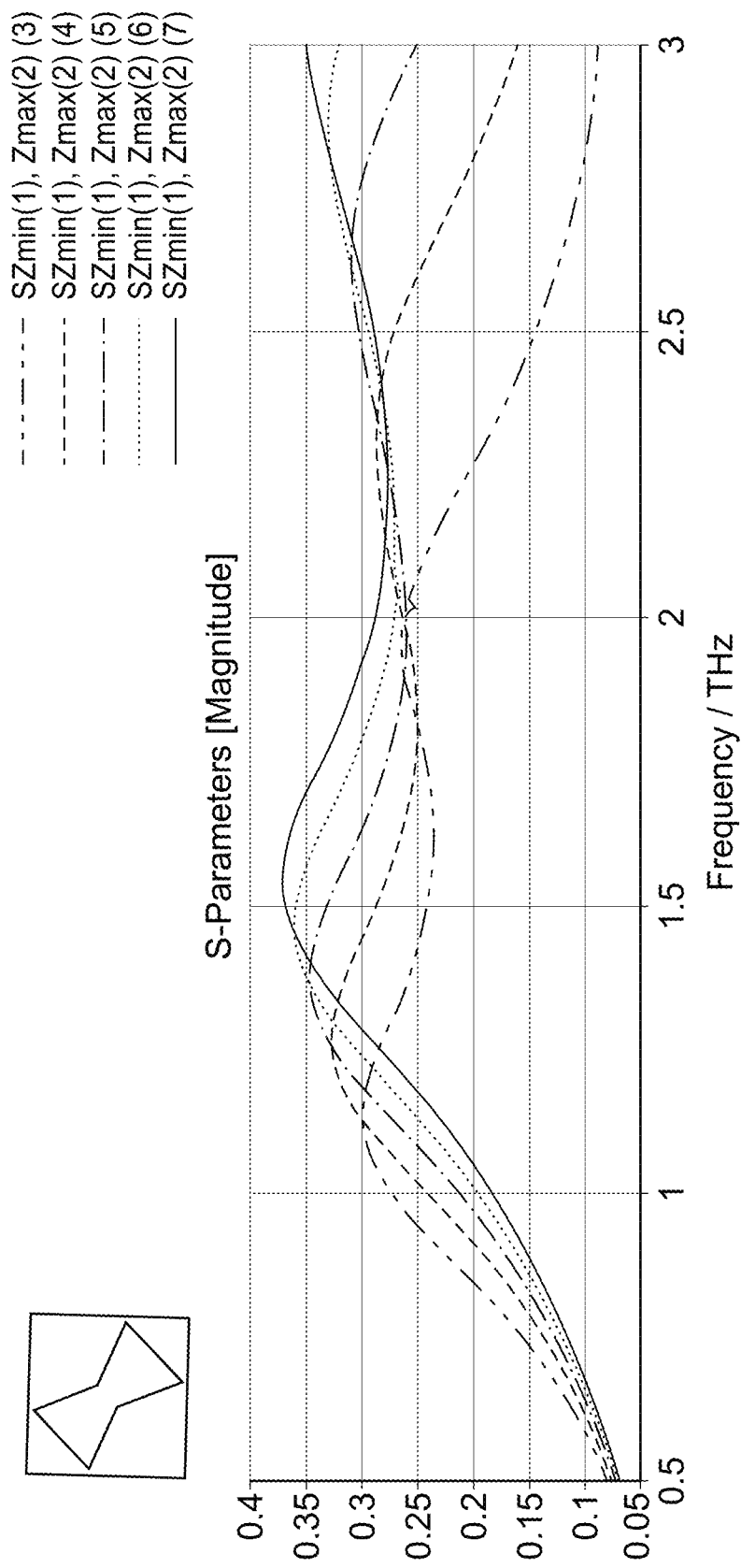
FIGS. 7A-7F illustrate magnitudes of the electrically tunable metasurface corresponding to different configurations when plane waves of different frequencies have been incident, in accordance with various non-limiting embodiments of the present disclosure.
Figure 7B:
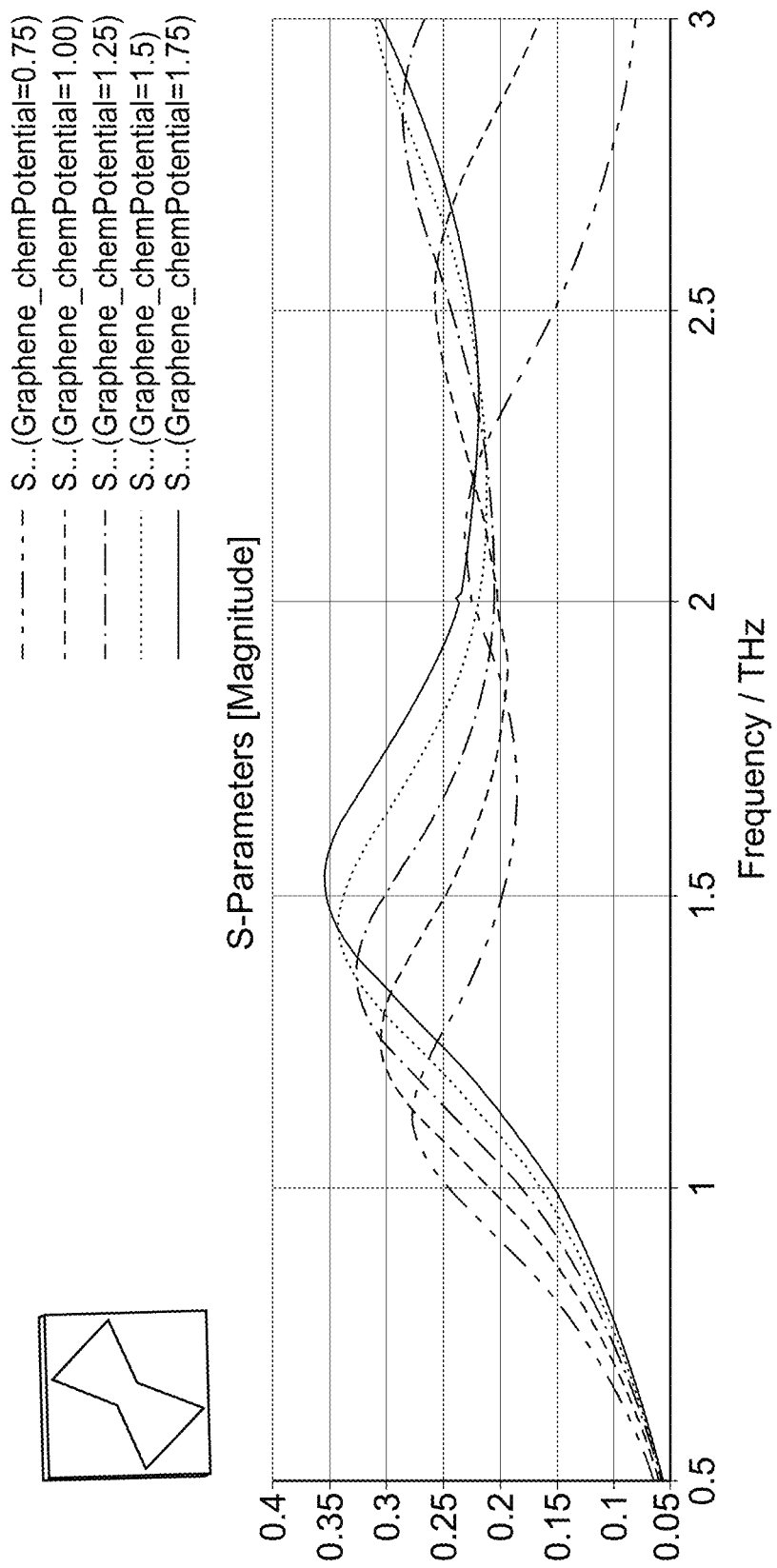
Figure 7C:
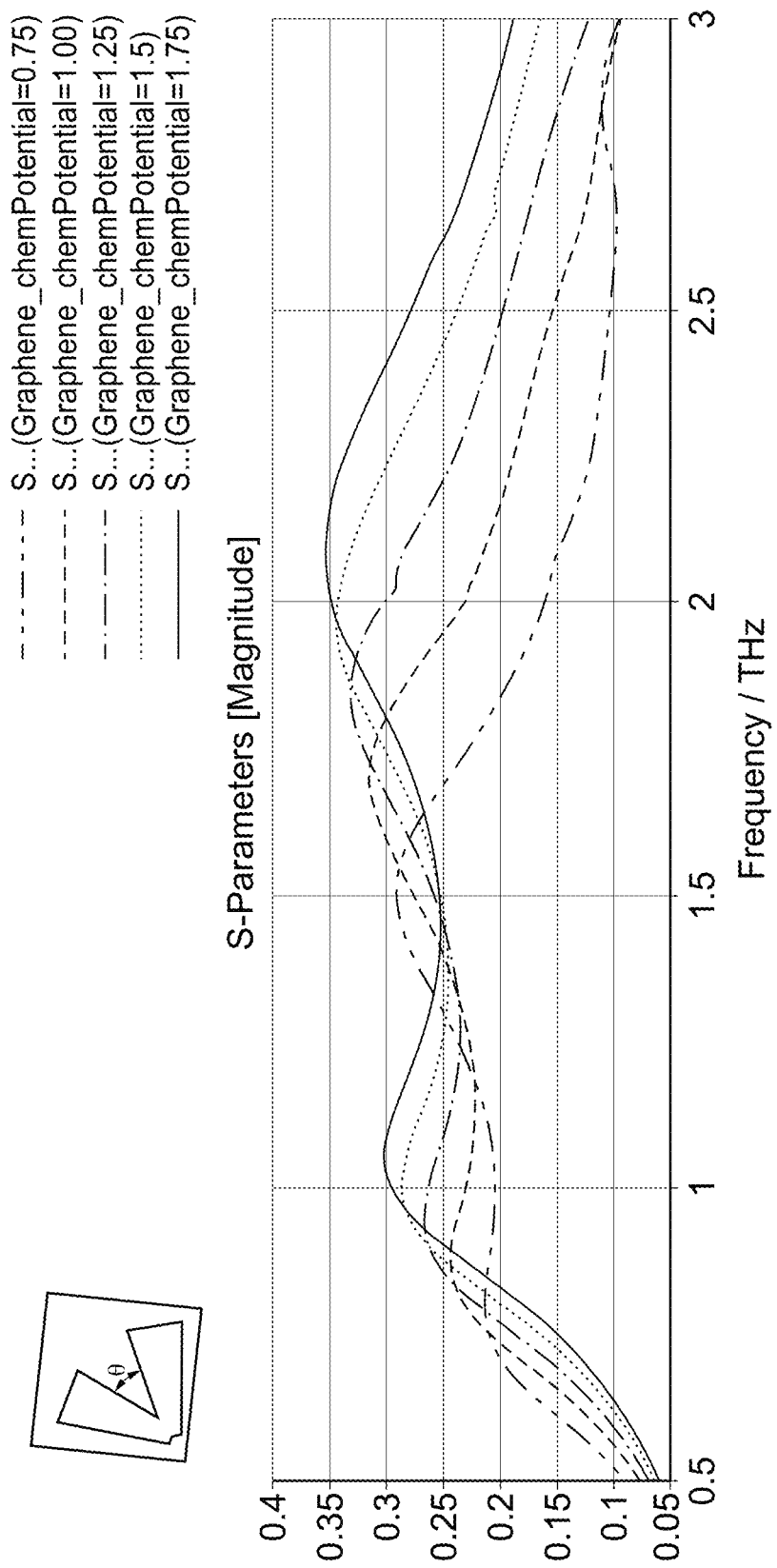
Figure 7D:
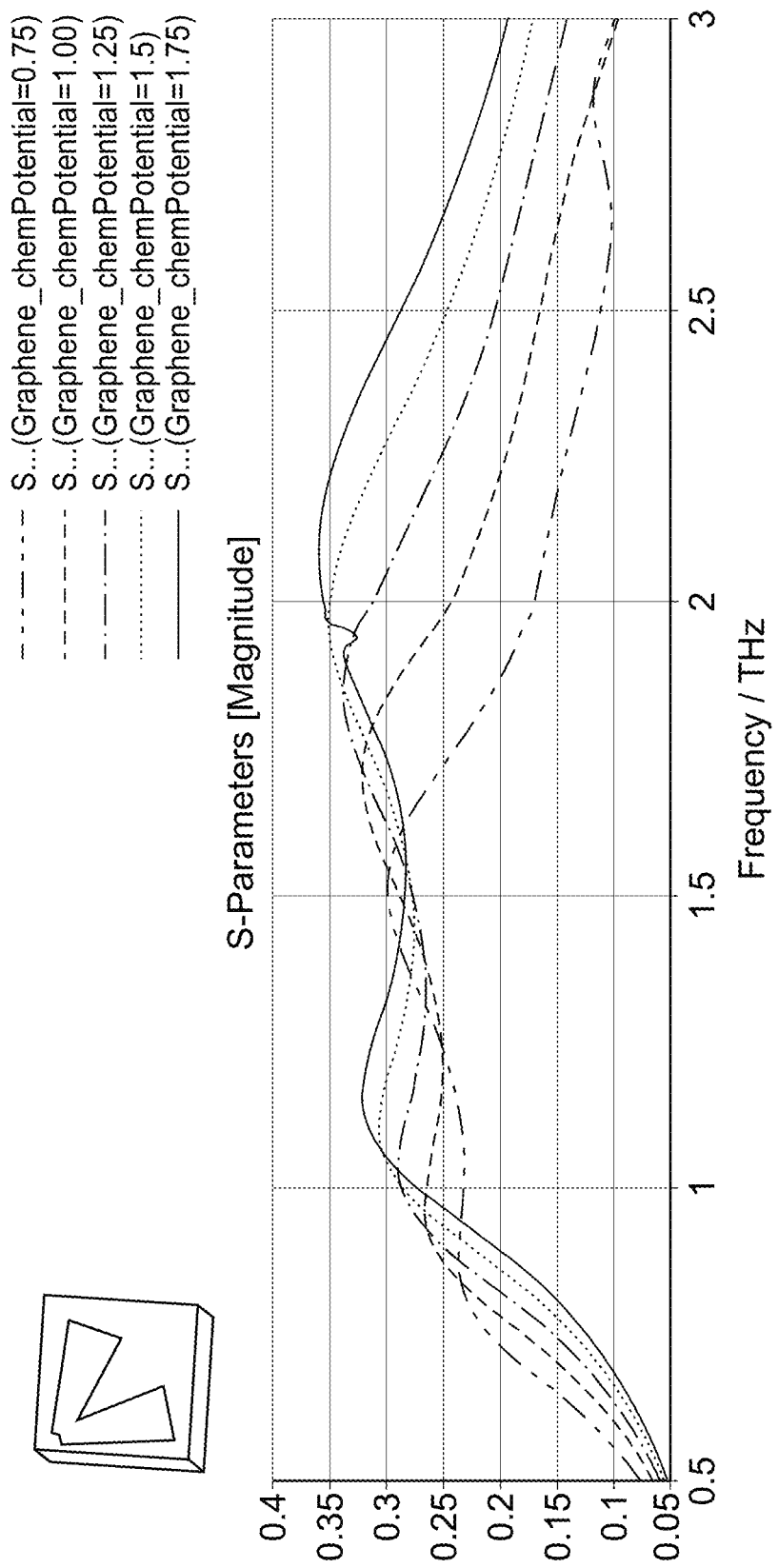
Figure 7E:
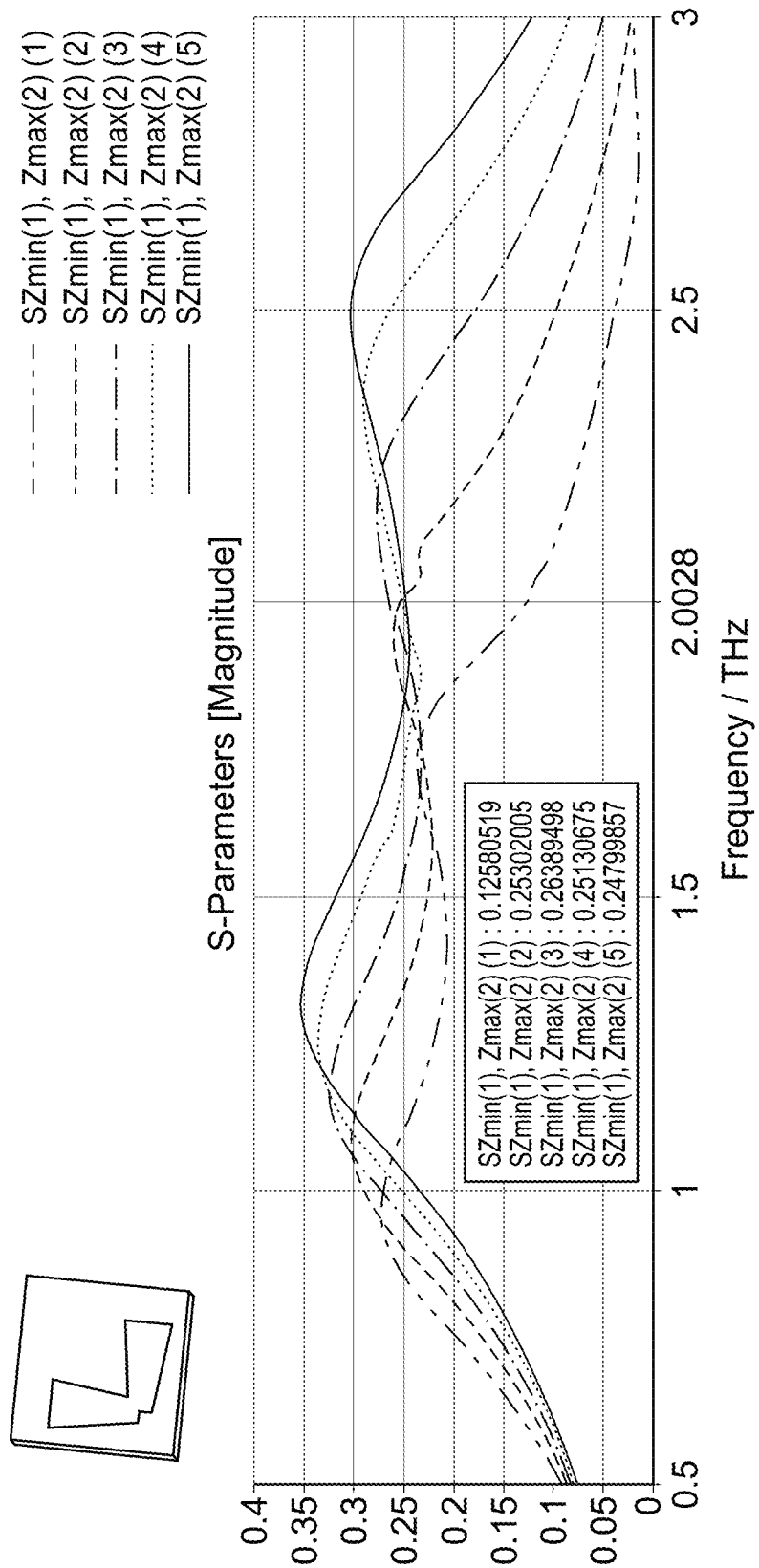
Figure 7F:
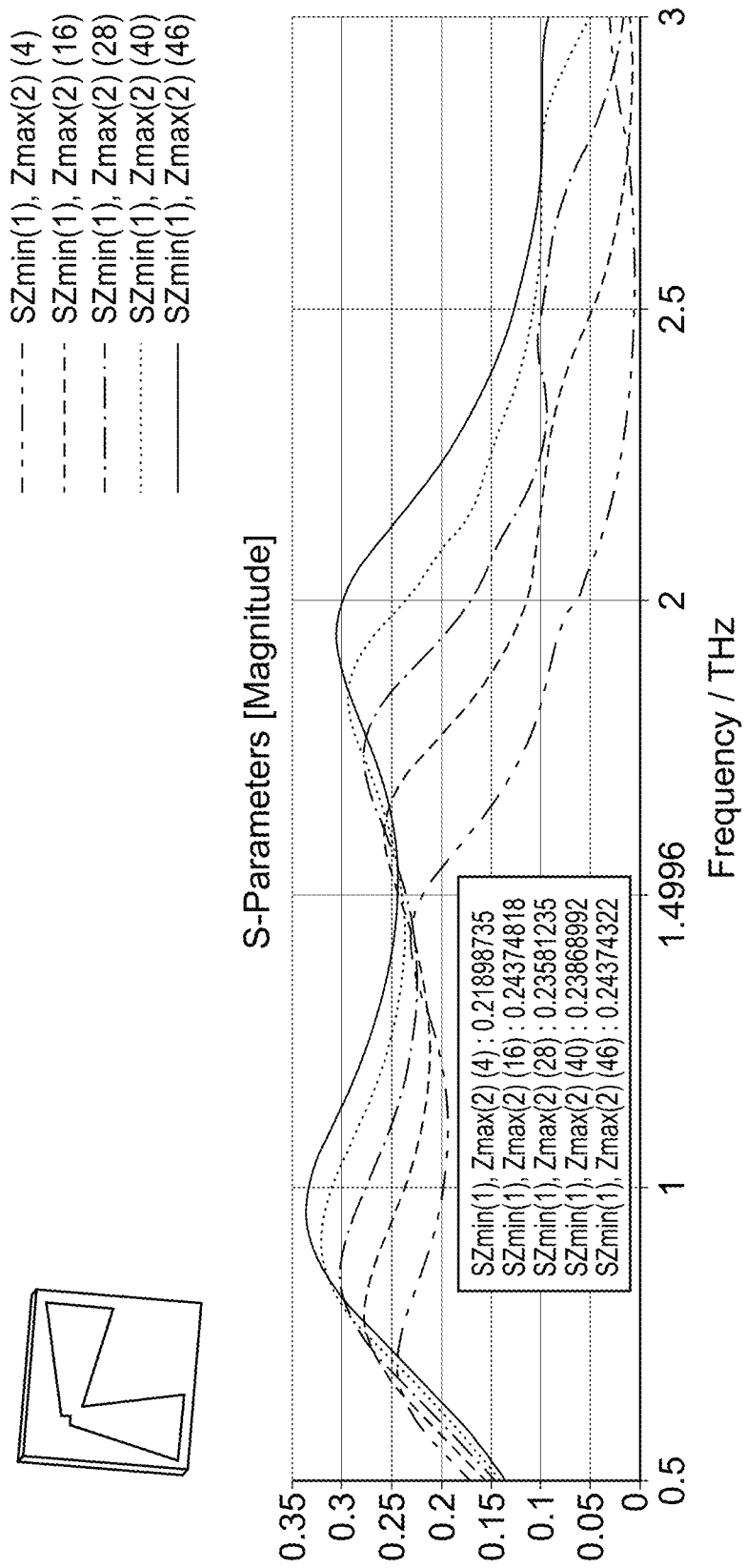

FIGS. 7A-7F illustrate magnitude response of the electrically tunable metasurface 300 corresponding to different configurations when plane waves of different frequencies have been incident, in accordance with various non-limiting embodiments of the present disclosure. FIG. 7A illustrates magnitude response of the L1 configuration of the bow-tie radiator element 304 with incident plane waves having an operational frequency range between 0.5-3 THz. FIG. 7B illustrates magnitude response of the L5 configuration of the bow-tie radiator element 304 with incident plane waves having an operational frequency range between 0.5-3 THz are incident. FIG. 7C illustrates magnitude response of the L2 configuration of the bow-tie radiator element 304 with incident plane waves having an operational frequency range between 0.5-3 THz. FIG. 7D illustrates magnitude response of the L6 configuration of the bow-tie radiator element 304 with incident plane waves having an operational frequency range between 0.5-3 THz are incident. FIG. 7E illustrates magnitude response of the L3 configuration of the bow-tie radiator element 304 with incident plane waves having an operational frequency range between 0.5-3 THz are incident. FIG. 7F illustrates magnitude response of the L7 configuration of the bow-tie radiator element 304 with incident plane waves having an operational frequency range between 0.5-3 THz are incident.

Figure 8:
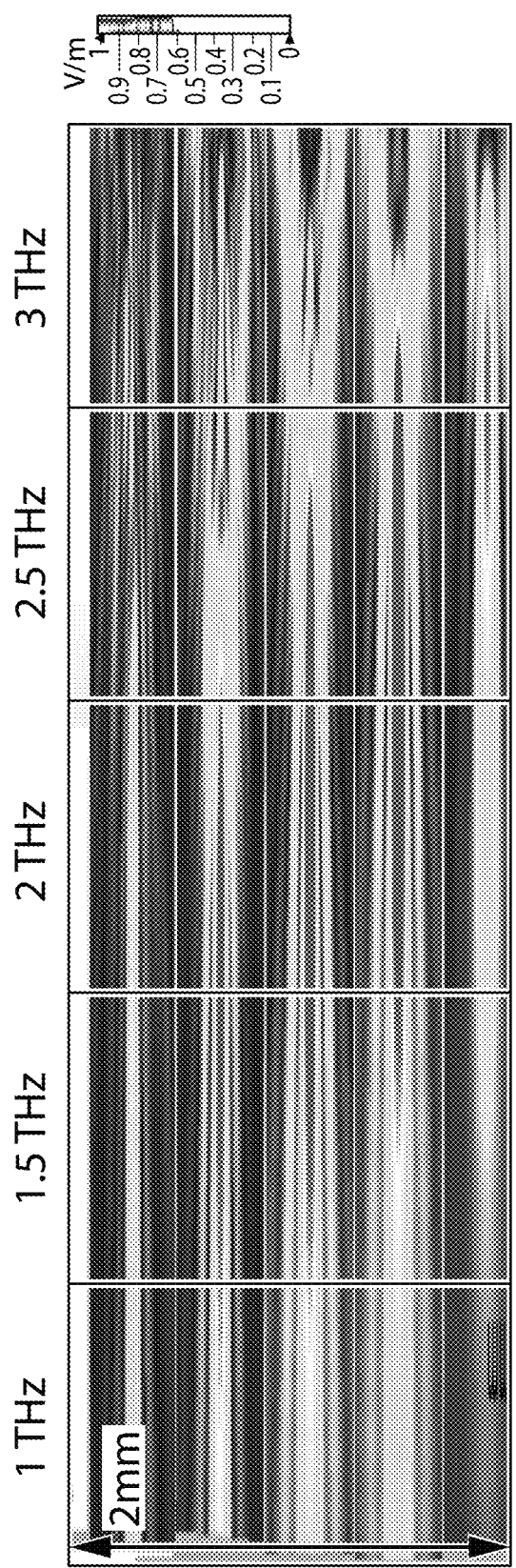
FIG. 8 illustrates experimentally obtained intensity distributions for the electrically tunable metasurface corresponding to different frequencies of the incident plane waves, in accordance with various non-limiting embodiments of the present disclosure.

FIG. 8 illustrates intensity distributions for the electrically tunable metasurface 300 of FIG. 2 obtained experimentally corresponding to different frequencies and applied bias voltages of the incident plane waves, in accordance with various non-limiting embodiments of the present disclosure.

Figure 9:
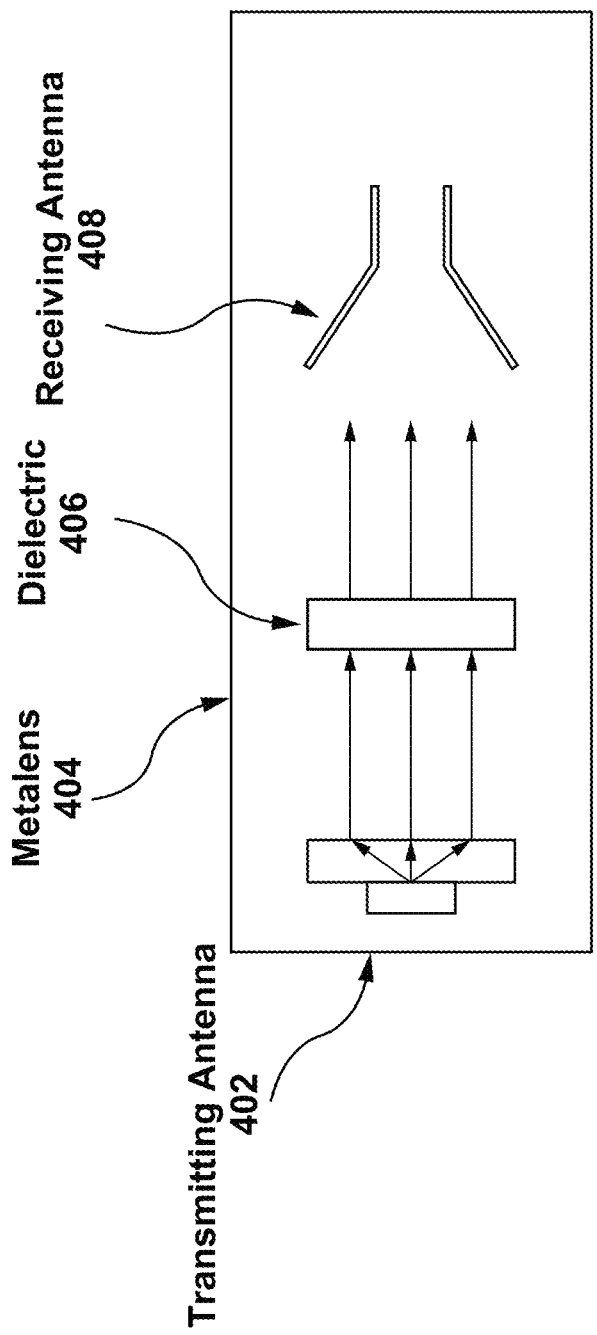
FIG. 9 illustrates a high-level block diagram of an apparatus configured to characterize material, in accordance with various non-limiting embodiments of the present disclosure.

It is to be noted that the electrically tunable metasurface 300 may find its application in various fields, such as, for example, in the field of material characterization. FIG. 9 illustrates a high-level block diagram of an apparatus 400 configured to characterize material, in accordance with various non-limiting embodiments of the present disclosure. As shown, the apparatus 400 may include a transmitting antenna 402, a metalens 404, and a receiving antenna 408. It is to be noted that the apparatus 400 may include other components but such components have been omitted from the FIG. 9 for the purpose of simplicity.

In certain non-limiting embodiments, the electrically tunable metasurface 300 may act as the metalens 404. Further, the metalens 404 may be integrated with the transmitting antenna 402. The transmitting antenna 402 together with the metalens 404 may act as a transmitter. The transmitting antenna 402 may incident the plane waves over the metalens 404. In certain non-limiting embodiments, the transmitting antenna 402 may be a dipole antenna or any other suitable antenna. The metalens 404 may modulate the propagation characteristics of the incident plane waves and forward the incident plane waves towards a dielectric material 406. The characterization properties such as permittivity, loss tangent or the like of the dielectric material 406 may be unknown and the apparatus 400 may be configured to determine the characterization properties of the dielectric material 406. The incident plane waves from the metalens 404 may be transmitted through the dielectric material 406 and received by the receiving antenna 408. In certain non-limiting embodiments, the receiving antenna 408 may be a horn antenna or any other suitable antenna.

Figure 10:
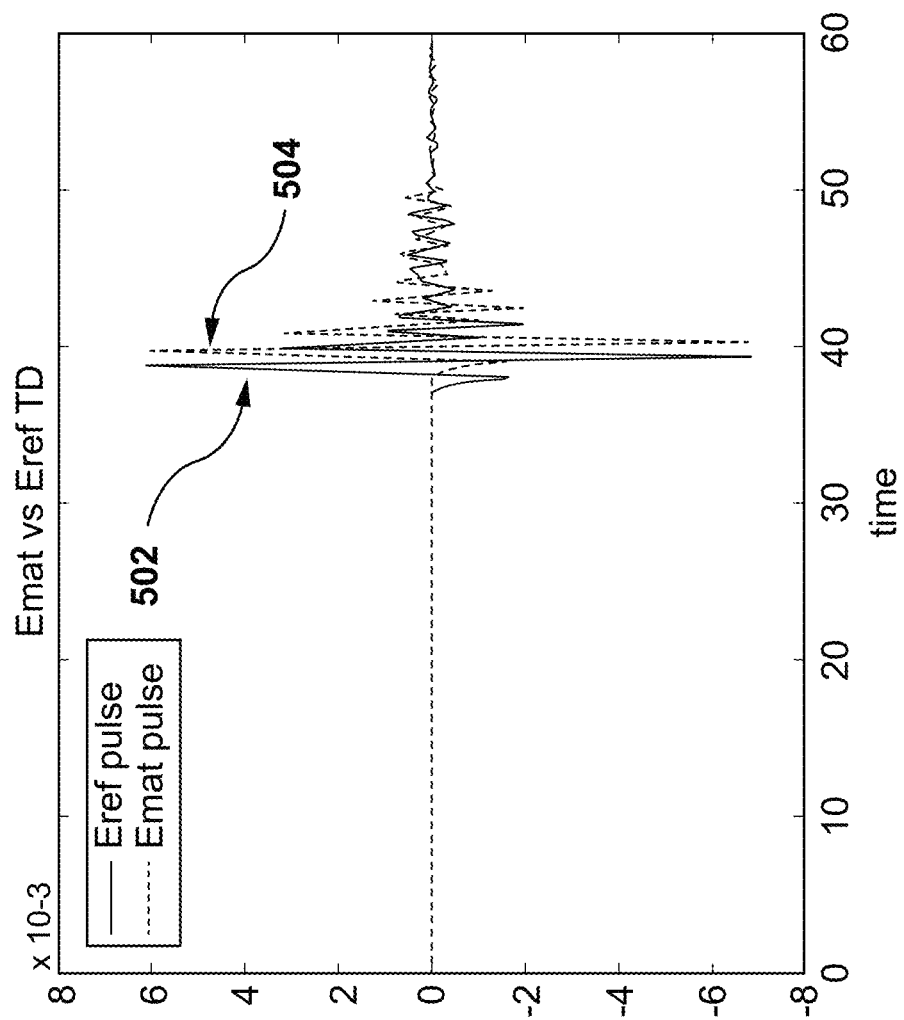
FIG. 10 illustrates the received incident plane waves with and without the dielectric material, in accordance with various non-limiting embodiments of the present disclosure.

Based on the received incident plane wave by the receiving antenna 408, the apparatus 400 may determine the characterization properties such as permittivity and loss tangent of the dielectric material 406. In certain non-limiting embodiments, the incident plane wave may first be transmitted without the dielectric material 406. FIG. 9 illustrates the received incident plane waves with and without the dielectric material 406, in accordance with various non-limiting embodiments. As shown on FIG. 10, the received incident plane wave without the dielectric material 406 is illustrated as received incident plane wave 502. Also, the received incident plane wave with the dielectric material 406 is illustrated as received incident plane wave 504.

Figure 11:
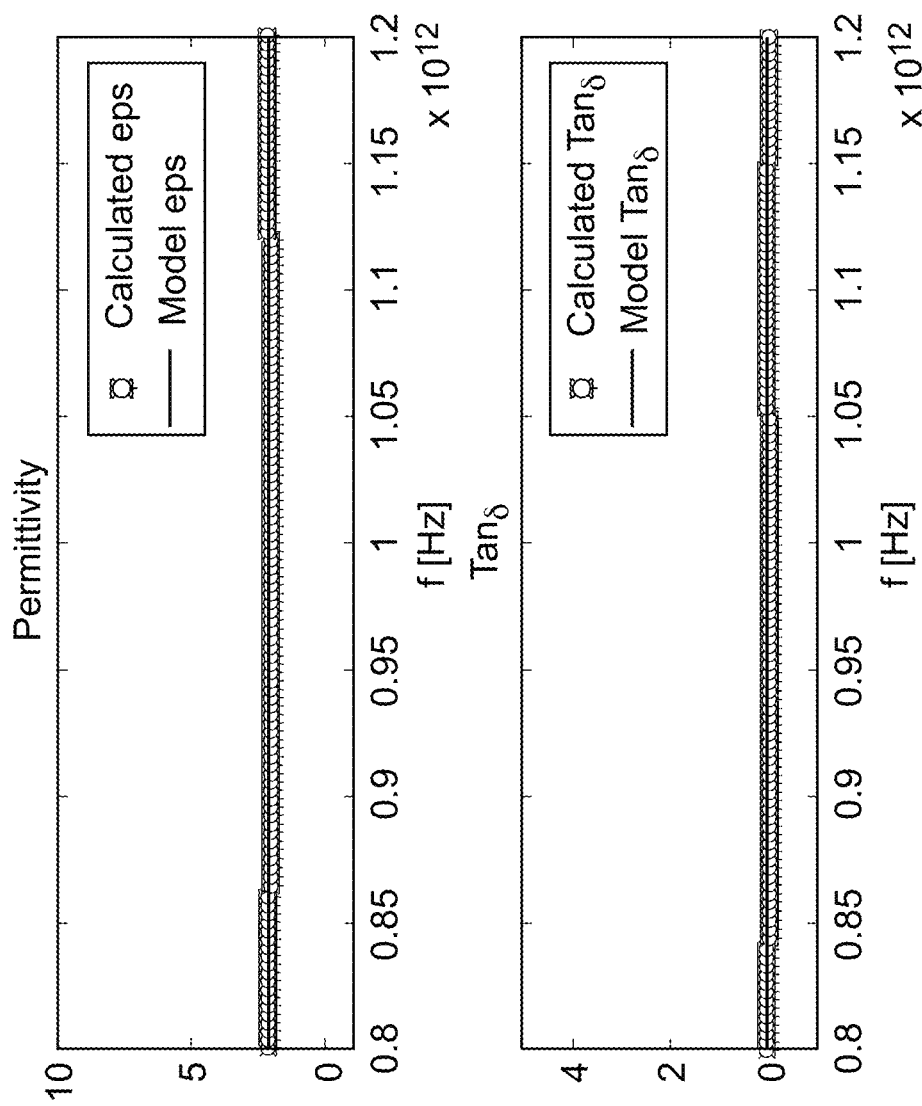
FIG. 11 illustrates the computed permittivity and the loss tangent of the received incident plane waves, in accordance with various non-limiting embodiments of the present disclosure.

Based on the received incident plane waves 502 and 504, the apparatus 400 may determine the permittivity and the loss tangent of the dielectric material 406. To do so, in certain non-limiting embodiments, the apparatus 400 may include a processor (not illustrated) to perform the required computations and determinations. FIG. 11 illustrates the computed permittivity and the loss tangent of the received incident plane waves 502 and 504, in accordance with various non-limiting embodiments of the present disclosure.

It is to be noted that the electrically tunable metasurface 300 may find its application in various other fields. By way of example, in the field of communication where the electrically tunable metasurface 300 may be included in a transmitter and/or a receiver to control the propagation of the incident plane waves by modulating the propagation characteristics.

In other examples, the electrically tunable metasurface 300 may find its application in the field of sensing and/or imaging. In such, examples, the electrically tunable metasurface 300 may act as a metalens and may offer its operation over a wideband (e.g., over an operational frequency range between 0.5-3 THz).

In certain non-limiting embodiments, where is the electrically tunable metasurface 300 is operating as a metalens, the focal length of the metalens may be controlled by varying the biasing voltages.

Figure 12:
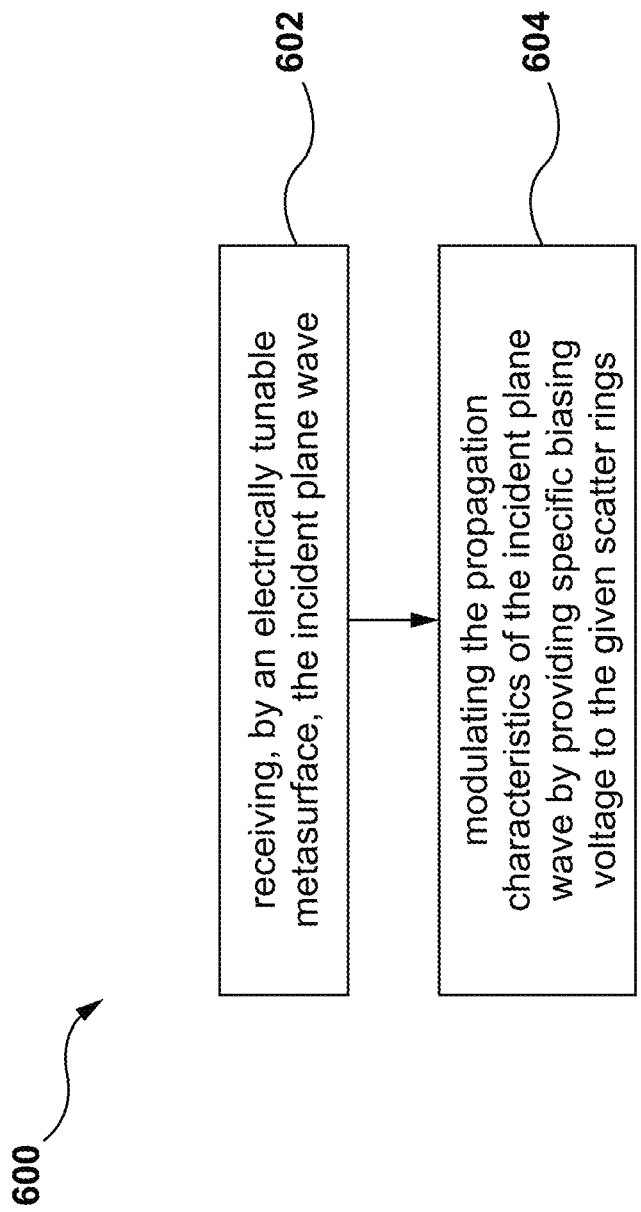
FIG. 12 illustrates a flowchart representing of a process of a method for modulating propagation characteristics of an incident plane wave, in accordance with various non-limiting embodiments of the present disclosure.

FIG. 12 illustrates a flowchart representing a process 600 of a method for modulating propagation characteristics of an incident plane wave, in accordance with various non-limiting embodiments of the present disclosure.

As shown, the process 600 commences at step 602 where the electrically tunable metasurface 300 receives an incident plane wave. As previously, discussed the electrically tunable metasurface 300 may receive incident plane waves having a frequency in the range of 0.5-3 THz.

The process 600 proceeds to step 604 where the electrically tunable metasurface 300 modulates the propagation characteristics of the incident plane wave by providing specific biasing voltage to the scatterer rings. As previously noted, the plurality of scatterer rings 302 may modulate the propagation characteristics, such as phase and magnitude of the incident plane wave based on biasing voltages provided by the electrodes (e.g., the electrodes 310 and 314). In certain non-limiting steps, the propagation characteristics of the incident plane wave may be modulated by altering the biasing voltages.

It is to be understood that the operations and functionality of the electrically tunable metasurface 300, constituent components, and associated processes may be achieved by any one or more of hardware-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An electrically tunable metasurface comprising:
   a plurality of circular scatterer rings, each scatterer ring of the plurality of circular scatterer rings includes bow-tie shaped radiator elements, in which the bow-tie shaped radiator elements have a same geometric configuration; and
   a plurality of electrodes, each electrode of the plurality of electrodes is associated with a scatterer ring of the plurality of the circular scatterer rings respectively, and each electrode of the plurality of electrodes being configured to provide a specific biasing voltage to its associated circular scatterer ring respectively,
   wherein a phase response of an outer scatterer ring of the plurality of circular scatterer rings is smaller as compared to a phase response of an inner scatterer ring of the plurality of circular scatterer rings.

2. The electrically tunable metasurface of claim 1, wherein for each of the plurality of circular scatterer rings:
   the included bow-tie shaped radiator elements have a specific geometric configuration.

3. The electrically tunable metasurface of claim 1, wherein for each of the plurality of circular scatterer rings:
   each of the included bow-tie shaped radiator elements includes two radiator elements and the geometric configuration associated with the bow-tie shaped radiator elements corresponds to an angle between the two radiator elements.

4. The electrically tunable metasurface of claim 3, wherein for each of the plurality of circular scatterer rings:
   the two radiator elements of the included bow-tie shaped element are either triangular shaped radiator elements or trapezoidal shaped radiator elements.

5. The electrically tunable metasurface of claim 1, wherein for each of the plurality of circular scatterer rings:
   the geometric configuration associated with the bow-tie shaped radiator elements corresponds to an angular orientation of the bow-tie shaped radiator elements.

6. The electrically tunable metasurface of claim 1, wherein the metasurface is constructed using graphene material.

7. The electrically tunable metasurface of claim 1, wherein the plurality of circular scatterer rings are configured to modulate propagation characteristics of an incident plane wave.

8. The electrically tunable metasurface of claim 7, wherein the propagation characteristics are a phase and a magnitude of the incident plane wave.

9. The electrically tunable metasurface of claim 8, wherein the phase of the incident wave is modulated in a range of 0 to $2\pi$.

10. The electrically tunable metasurface of claim 7, wherein the propagation characteristics of the incident plane wave are modulated by varying the biasing voltage provided to at least one of the plurality of circular scatterer rings.

11. The electrically tunable metasurface of claim 1, wherein the plurality of circular scatterer rings are concentric.

12. The electrically tunable metasurface of claim 1, wherein for each of the plurality of circular scatterer rings:
    the bow-tie shaped radiator elements are subwavelength radiator elements.

13. The electrically tunable metasurface of claim 1, wherein the electrically tunable metasurface is operating as a metalens, and a focal length of the metalens is controlled by varying the biasing voltage provided to at least one of the plurality of circular scatterer rings.

14. An apparatus to characterize properties of a dielectric material, the apparatus comprising:
    an electrically tunable metasurface comprising:
       a plurality of circular scatterer rings, each scatterer ring of the plurality of circular scatterer rings includes bow-tie shaped radiator elements, in which the bow-tie shaped radiator elements have a same geometric configuration, and
       a plurality of electrodes, each electrode of the plurality of electrodes is associated with a scatterer ring of the plurality of the circular scatterer rings respectively, and each electrode of the plurality of electrodes being configured to provide a specific biasing voltage to its associated circular scatterer ring respectively;
    a transmitting antenna configured to provide incident plane waves over the electrically tunable metasurface;
    the electrically tunable metasurface configured to modulate the propagation characteristics of the incident plane waves and forward the incident plane waves towards the dielectric material;
    a receiving antenna configured to receive the incident plane waves passed through the dielectric material; and
    a processor configured to process the received incident plane wave to determine characterization properties of the dielectric material.

15. A method for modulating propagation characteristics of an incident plane wave, the method comprising:
    receiving, by an electrically tunable metasurface, the incident plane wave, in which the electrically tunable metasurface comprises:
       a plurality of circular scatterer rings, each scatterer ring of the plurality of circular scatterer rings includes bow-tie shaped radiator elements, in which the bow-tie shaped radiator elements have a same geometric configuration;
       a plurality of electrodes, each electrode of the plurality of electrodes is associated with a scatterer ring of the plurality of the circular scatterer rings respectively, and each electrode of the plurality of electrodes being configured to provide a specific biasing voltage to its associated circular scatterer ring respectively; and modulating the propagation characteristics of the incident plane wave by providing the specific biasing voltage to the each of the plurality of circular scatterer rings, wherein a phase response of an outer scatterer ring of the plurality of circular scatterer rings is smaller as compared to a phase response of an inner scatterer ring of the plurality of circular scatterer rings.

16. The apparatus of claim 14, wherein for each of the plurality of circular scatterer rings:

the bow-tie shaped radiator elements associated with each scatterer ring have a specific geometric configuration.

17. The apparatus of claim 14, wherein for each of the plurality of circular scatterer rings:

each of the included bow-tie shaped radiator element includes two radiator elements and the geometric configuration associated with the bow-tie shaped radiator elements corresponds to an angle between the two radiator elements.

18. The electrically tunable metasurface of claim 1, wherein the biasing voltage provided to each of the plurality of circular scatterer rings varies based on the frequency of incident plane waves over the electrically tunable metasurface.

19. The electrically tunable metasurface of claim 18, wherein the biasing voltage provided to each of the plurality of circular scatterer rings varies further based on the geometric configuration associated with the bow-tie shaped radiator elements of the at least one of the plurality of circular scatterer rings.

20. The electrically tunable metasurface of claim 13, wherein the metalens operates at 1-3 THz, reaching a broad bandwidth of 2 THz.

* * * * *